Figure 1:
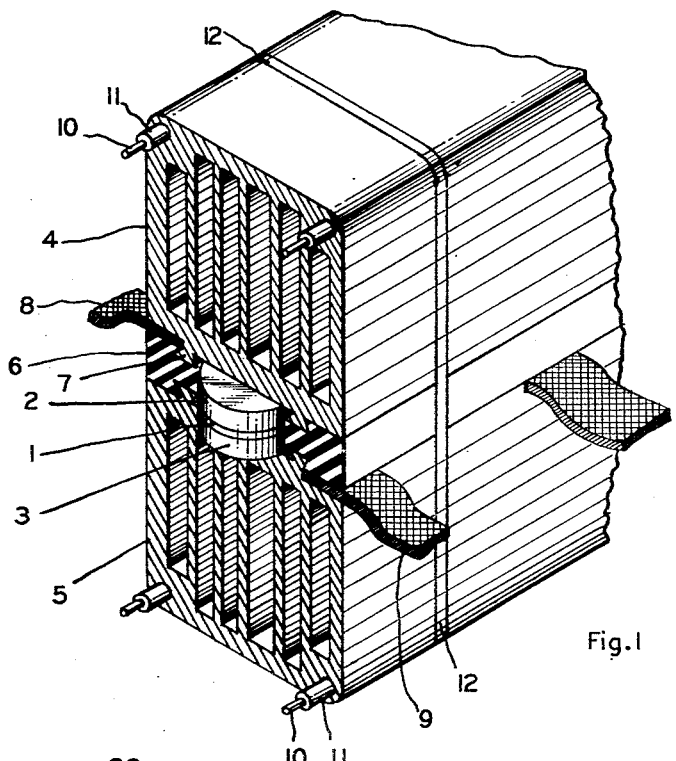

Dec. 3, 1957  S. P. JACKSON ET AL  2,815,472
RECTIFIER UNIT
Filed Dec. 21, 1954

Inventors:
Stuart P. Jackson
Carl E. Bacon
by, Richard E. Hosley
Their Attorney

United States Patent Office 2,815,472
Patented Dec. 3, 1957

2,815,472
RECTIFIER UNIT

Stuart P. Jackson, Lynn, and Carl E. Bacon, Saugus, Mass., assignors to General Electric Company, a corporation of New York Application December 21, 1954, Serial No. 476,685

11 Claims. (Cl. 317—234)

Our invention relates to rectifier units in which provision is made for enclosing the rectifier cell in a mounting which protects it from destructive pressures and provides it with sufficient thermal mass and cooling to protect it from overheating and destruction when subjected to the usually encountered operating conditions.

Rectifier cells of the barrier layer type are sensitive to pressure, surrounding media, and heat. This is particularly true of monocrystal semiconductors having a rectifier barrier layer of the P–N type such as found in germanium and silicon rectifier cells.

The current carrying capacity of germanium and silicon cells of the broad area P–N junction type is remarkable. Thus a germanium cell about 9/16 inch in diameter will provide half wave rectification at 35 volts and 75 ampers with a heat loss of about 60 watts. These losses must be dissipated as fast as generated or the cell will overheat and be destroyed. Since a rectifier cell having the above-referred-to heat loss is smaller than a dime in size, it is quite obvious that its own thermal time constant is quite small being measured in cycles of the alternating current supply instead of in seconds as in electrical equipment of like current capacity such as rotating machines and transformers, where a like heat loss takes place in a mass of copper in the order of 10 pounds. Furthermore such cells having very thin barrier layers and operating at high voltage are sensitive to humidity, dust, corrosive fumes, fungus and other agents found in the atmosphere. To protect such cells against these adverse factors they should be enclosed and preferably hermetically sealed. Silicon and germanium cells are also sensitive to pressure not only because the metal of which they are formed is brittle but also because the impurity metals used to produce the desired P–N junctions therein may become plastic and squeezed out of the cell assembly due to pressures exerted therein. This is particularly true of a germanium cell where the indium used to produce an electron acceptor area in the cell becomes plastic at a comparatively low temperature.

Aside from these factors which should be considered in providing a satisfactory cell mounting in a rectifier unit there is the additional requirement that such units have a uniformity in structure with variations in cell size that will accommodate connection of the units in desired assemblies for combining or utilizing the electrical output of a plurality of such units. Mechanically the structure of the unit should provide a cooling thereof as effectively in an assembly as when a single unit is employed and where forced fluid cooling is employed the connections of the fluid cooling passageways of each unit must be readily connectible with one another to form conduits in the assembly.

It is an object of our invention to provide a rectifier unit having improved operating characteristics resulting from structural features thereof which provide for effective cooling of the rectifier cell mounted therein as well as for protecting it from excessive pressures and the effects of surrounding media in the atmosphere.

It is a further object of our invention to provide rectifier units having, irrespective of the variation in size of the rectifier cells mounted therein, a uniformity in structure that not only facilitates their manufacture but also provides for a simple and effective connection of units of the same or different ratings in assemblies requiring more than one of said units.

It is also an object of our invention to provide a rectifier unit in which the cell thereof is provided with heat absorbing and cooling members which effectively increase its thermal mass and consequently improve its thermal time constant.

It is another object of our invention to provide a rectifier unit of integral construction having cooling members of uniform cross section held in parallel position relative to one another with corresponding surfaces thereof in heat conductive engagement with the opposed contact surfaces of a rectifier cell sandwiched therebetween and enclosed by insulating material located between and coextensive with these cooling members to which it is bonded at the surfaces thereof which extend beyond the cell.

It is also an object of our invention to provide in each of the cooling members of a rectifier unit, longitudinally extending cooling fluid passageways which terminate at each end thereof in positions which register with the corresponding cooling fluid passageways of like units to form a continuous conduit for forced fluid cooling of an assembly of such units connected in end-to-end relationship with one another.

Further objects and advantages of our invention will become apparent from the following description of the embodiments thereof shown in the drawing.

Figure 2:
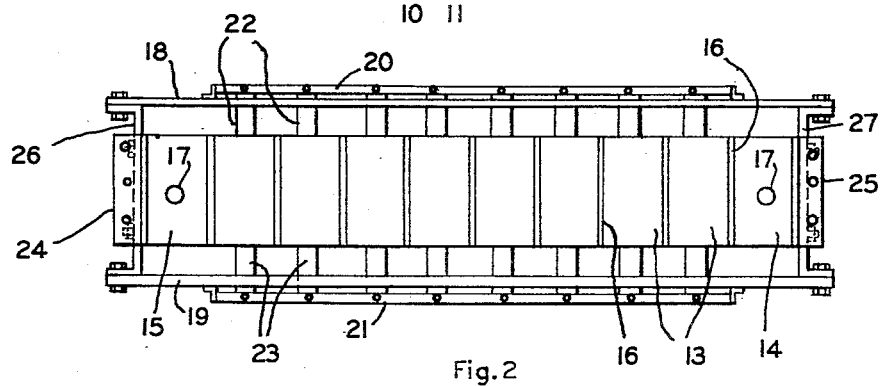
Figure 3:
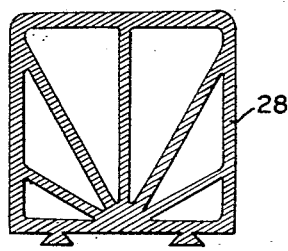

In the drawing Fig. 1 is a perspective view showing in cross section the structure of a rectifier unit embodying our invention and the manner in which it is mechanically connected with like units to form an assembly embodying two or more units; Fig. 2 is a plan view of an assembly of a plurality of such units, and Fig. 3 is a cross sectional view showing the modified structure of a cooling element which may form part of a rectifier unit embodying our invention.

In accordance with the disclosure of our invention shown in the accompanying drawing, the rectifier units embody a pair of parallel coextensive metallic cooling members having corresponding side walls facing one another and bonded throughout their length to an intermediate layer of insulating material except where these side walls respectively make a heat conducting and electric current conducting engagement with the opposed contact surfaces of a rectifier cell. The rectifier cell is thus enclosed between the cooling members and sealed from the surrounding atmosphere by the insulating material which is bonded to the surfaces of the cooling members which extend beyond the portions thereof which are in contact with the rectifier cell contact surfaces. Each of the cooling members is of uniform cross section throughout its length and is provided with internal cooling fluid passageways defined by longitudinally extending partitioning walls making a heat conductive engagement with the opposed side wall faces of the cooling members which are held in engagement with the opposite contact surfaces of the rectifier cell sandwiched therebetween. Heat absorbing members may be interposed between the rectifier cell and the cooling members or the cooling members may have sufficient mass to act as heat absorbing members. The longitudinally extending cooling fluid passageways in each of the cooling members terminate at the ends thereof in positions which register with the corresponding fluid passageways of like units to form a continuous conduit for forced fluid cooling of an assembly of such units connected in end-to-end relationship with one another. A metallic terminal lead is attached to each cooling member which is also formed of metal and serves as a connection between these terminal members and the opposite contact surfaces of the rectifier cell engaged thereby. The leads for each rectifier unit preferably extend from opposite sides thereof.

Our rectifier unit has improved operating characteristics resulting from the size of its cooling units and the mass of metal in heat conducting engagement with the rectifier cell. This increases the thermal capactiy of the cell which thus increases thermal time constant so that it is better able to withstand fault currents and provide sufficient time for protective equipment associated therewith to come into operation and thus prevent the cell from being destroyed.

The cooling members are preferably formed by extrusion but casting or other manufacturing techniques may be employed in making them. They may be formed of rolled or drawn metal when enclosed internal passageways are not required for containing the cooling fluid. Being of uniform cross section, corresponding cooling members may be joined readily in end-to-end relation to form assemblies. The sizes of the cooling members may be suited to the sizes and heat losses of rectifier cells of different sizes by using suitable lengths of the stock material from which they are formed. Units for different cell sizes may consequently differ from one another only in their lengths.

Suitable natural or artificial resins may be used by bonding the cooling members to one another and for holding them in contact with the contact surfaces of the rectifier cell sandwiched therebetween. We preferably use an epoxide resin for this purpose because of its desirable characteristics including excellent adhesion to metals, high dielectric strength, low moisture absorption, low shrinkage, and high temperature stability.

Rectifier units embodying our invention are structurally suited for mass manufacturing procedures. Furthermore the rectifier cell is entirely enclosed in its mounting unit and provided with double sided cooling by members which form a mechanical shield therefor and thus protect it from knocks and blows to which the rectifier unit may be subjected in use or when being assembled as part of a translating device.

The rectifier unit shown in Fig. 1 comprises a germanium cell 1 of the broad area P–N junction type having opposed contact surfaces which make a good heat conducting engagement with heat absorbing members 2 and 3 which are in engagement therewith. These heat absorbing members are formed of a metal such as copper or a copper alloy and may be physically attached to the contact surface of the cell and in some cases will form the electrodes thereof. This cell assembly is provided with cooling members 4 and 5 having corresponding side walls facing one another and bonded throughout their lengths to an intermediate layer of insulating material 6 except where these side walls respectively make a heat conducting engagement with one of the opposite contact surfaces of the cell or the heat absorbing members interposed between the cell and the cooling members. The cooling members are made of a length of extruded material and have lengthwise thereof corresponding longitudinally cooling fluid passageways which terminate at their ends. The cooling fluid passageways in each cooling member are defined by walls which make a heat conductive engagement with the side wall portion of the members having an external contact surface in heat conducting engagement with the contact surface of the cell or the heat absorbing members interposed between the cell and the cooling members. The cooling members are preferably formed of a metal or alloy having desirable extrusion characteristics. They may be formed of copper, brass, aluminum or like metals and alloys.

The body of insulating material between and coextensive with the cooling members effectively enclose the cell and the heat absorbing members associated therewith. It is bonded to the cooling members at their side wall contact surfaces which extend beyond the cell and the heat absorbing members. In order to increase the strength of the bond between this insulating material and the surface of the cooling members which it engages the cooling members may be provided with anchoring lugs 7 which are embedded in the insulating material. When extrusions are used for the cooling members these anchoring lugs will extend lengthwise thereof as to the cooling fluid passageways within the cooling members.

Electrical connections are made with the cell through terminal leads 8 and 9 which are respectively attached to the cooling members 4 and 5 and extend from opposite sides thereof. These terminal leads are preferably made flexible so that forces can not be transmitted through them and the cooling members which they engage to the rectifier cell which is enclosed between the cooling members. Braided copper strips are admirably suited for this purpose. The ends thereof which engage the cooling members are attached thereto by soldering, brazing, welding, or like means and an electrical connection is made with the opposed contact surfaces of the cell through the respective cooling members which are also formed of metal.

A plurality of these rectifier units may be assembled in end-to-end relationship with the cooling fluid passageways of corresponding cooling members in register with one another to form conduits for the forced circulation of cooling fluid through each of the units in the assembly. In the arrangement shown in Fig. 1 the units are held together by metal rods 10 which are electrically insulated from the cooling members of each unit by tubes of insulation 11. Furthermore the cooling members of each unit are electrically insulated from one another by a gasket 12 which forms a fluid tight connection between adjacent rectifier units. Thus an assembly such as indicated in Fig. 1 is suited for any desired electrical connection of the rectifier untis and for the forced circulation of a cooling liquid such as water, oil, or the like. The assembly is compact and the interconnection of the cooling fluid passageways of each cell are made in a simple and effective manner. Furthermore the resulting assembly is mechanically rigid and readily supported by attachments which may be applied at the ends of the assembly or at any other position along its length.

One such assembly is shown in Fig. 2 where nine rectifier units 13 are connected in end-to-end relationship with one another between headers 14 and 15 by means of which cooling fluid is supplied to and exhausted from the conduit formed by the resulting interconnection of the cooling fluid passageways of each of the rectifier units. As in Fig. 1 gaskets 16 are provided between each of the rectifier units and the headers 14 and 15. Each of the headers are also provided with openings 17 therein by means of which cooling fluid may be supplied to and exhausted from these headers. The entire assembly is held together by tie bars 18 and 19 which may be formed of insulating material and also act as a support for continuous or sectionalized bus bars 20 and 21 by means of which the terminal leads 22 and 23 of the several rectifier units are interconnected in any desired manner. In the arrangement illustrated the terminal leads are connected to the bus bars 20 and 21 to provide a multiple connection of the rectifier units. Supporting pedestals 24 and 25 are provided at each end of the assembly. These pedestals also act as supports for channel shaped members 26 and 27 to which the ends of the tie bars 18 and 19 are bolted.

It is of course apparent that the cooling members of our rectifier unit may be variously modified in order to improve their heat storage and cooling characteristics. One such variation has been shown in Fig. 3 where the internal wall structure forming the cooling fluid passageways of cooling member 28 radiates from an enlarged area directly opposite that portion thereof which engages the rectifier cell or the heat absorbing member positioned between the cell and the cooling member. By employing the arrangement shown in Fig. 3 a somewhat better heat flow characteristic is imparted to the structure than is obtained with the construction shown in Fig. 1.

It is of course apparent that even where forced fluid cooling is employed the cooling members do not of necessity embody internally finned structures such as shown in the drawing. It is also apparent that under certain circumstances where a closed cooling system is not desirable, the cooling members may be externally finned structures designed primarily for radiating heat to the surrounding atmosphere. These structures could also be employed where a circulation of air is obtained by natural convection or by the use of blowers. It is also apparent that as part of a rectifier assembly, heat exchangers may be employed for cooling the fluid circulated through the cooling members in order to provide a closed system in which the same cooling fluid is used over and over again. In fact the cooling members of the rectifier assembly may form the evaporator of a refrigerating machine. Furthermore the rectifier units may be assembled to form configurations other than rectilinear as shown in Fig. 2 of the drawing. Thus by using suitably shaped intermediate conduit sections, a serpentine or zigzag structure may be obtained to satisfy the space requirement imposed by certain structures in which an assembly of these units is used. Furthermore the individual units may be body shaped or end shaped to provide for their direct interconnection to form assemblies of desired configuration.

The cooling members need not of necessity be made of metal since certain plastics could be used for this purpose. Furthermore the insulating material used for enclosing the rectifier cell and holding the cooling members in position relative to one another in engagement with the rectifier cell or the heat absorbing members interposed between the cell and the cooling members may be of any suitable composition which enables it to be applied by casting, injection or other process to molds which hold the parts of the rectifier unit in assembled relation while applying the insulating material to form the desired resulting structure. It is also apparent that in many instances the terminal leads shown in the drawing may be omitted from all but one of the units in any assembly. Furthermore these terminal leads may be applied in other positions than those illustrated.

Obviously our invention is not limited to rectifier cells having P–N junctions of the type described since other rectifier cells embodying other barrier layers may be employed. Examples of such rectifiers are the selenium and copper oxide cells employed extensively as metallic rectifiers.

Thus while we have described certain preferred embodiments of our invention by way of illustrating its characteristic features, the above and other modifications will occur to those skilled in the art and we therefore wish it understood that we intend in the appended claims to cover all such modifications which fall within the true spirit and scope of our invention.

What we claim as new and desire to secure by Letters Patent of the United States is:

1. A rectifier unit comprising a unilaterally conductive cell having opposed contact surfaces, a pair of cooling members each of which has a uniform cross section throughout its length and has along one side thereof a plurality of longitudinally extending heat radiating walls which are spaced from one another and make a heat conductive engagement with a base portion thereof which on its other side has a contact surface part of which makes an intimate heat conducting engagement with a contact surface of said cell and part of which extends beyond the contact surface of said cell, a body of insulating material between and coextensive with said cooling members, said insulating material enclosing said cell and being bonded to said cooling members at their said contact surfaces which extend beyond the contact surfaces of said cell, and a terminal lead electrically connected to each of the opposed contact surfaces of said cell.

2. A rectifier unit comprising a unilaterally conductive cell having opposed contact surfaces, a pair of metallic cooling members each of which has a uniform cross section throughout its length and has along one side thereof a plurality of longitudinally extending heat radiating walls which are spaced from one another and make a heat conductive engagement with a base portion thereof which on its other side has a contact surface part of which makes an intimate heat conducting engagement with a contact surface of said cell and part of which extends beyond the contact surface of said cell, and a body of insulating material between and coextensive with said cooling members, said insulating material enclosing said cell and being bonded to said cooling members at their said contact surfaces which extend beyond the contact surfaces of said cell.

3. A rectifier unit comprising a unilaterally conductive cell having parallel opposed contact surfaces, a pair of parallel coextensive cooling members each of which has a uniform cross section throughout its length and has along one side thereof a plurality of longitudinally extending heat radiating walls which are spaced from one another and make a heat conductive engagement with a base portion thereof which on its other side has a contact surface part of which makes an intimate heat conducting engagement with a contact surface of said cell and part of which etxends beyond the contact surface of said cell, a body of insulating material between and coextensive with said cooling members, said insulating material enclosing said cell and being bonded to said cooling members at their said contact surfaces which extend beyond the contact surfaces of said cell, and a terminal electrically connected to each of the opposed contact surfaces of said cell.

4. A rectifier unit comprising a unilaterally conductive cell having opposed contact surfaces, a pair of hollow cooling members each of which has a uniform cross section throughout its length and has at least one internal cooling fluid pasageway along one side wall thereof, said one side wall of each of said hollow members being provided with an external contact surface part of which makes an intimate heat conducting engagement with a different one of said contact surfaces of said cell and part of which extends beyond the contact surfaces of said cell, and a body of insulating material between and coextensive with said cooling members, said insulating material totally enclosing said cell and being bonded to said cooling members at their said side wall contact surfaces which extend beyond the contact surfaces of said cell.

5. A rectifier unit comprising a unilaterally conductive cell having opposed contact surfaces, a pair of cooling members each of which has a uniform cross section throughout its length and longitudinally extending cooling fluid passageways therein defined by walls radiating from and making a heat conductive engagement with a portion of a side wall thereof which has an external contact surface part of which makes an intimate heat conducting engagement with a contact surface of said cell and part of which extends beyond the contact surface of said cell, a body of insulating material between and coextensive with said cooling members, said insulating material enclosing said cell and being bonded to said cooling members at their said side wall contact surfaces which extend beyond the contact surfaces of said cell, and a terminal lead electrically connected to each of the opposed contact surfaces of said cell.

6. A rectifier unit comprising a unilaterally conductive cell having opposed contact surfaces, a pair of heat absorbing members having opposed contact surfaces one of each of which makes a heat conducting engagement with one of the contact surfaces of said cell, said members having a thermal mass sufficient to increase by several times the thermal time constant of said cell, a pair of cooling members each of which has a uniform cross section throughout its length and has longitudinally extending cooling fluid passageways therein defined by longitudinally extending partitioning walls making a heat conductive engagement with a longitudinal side wall thereof having an external contact surface part of which makes an intimate heat conducting engagement with an outer end of one of said heat absorbing members which has its inner end in engagement with a contact surface of said cell and part of which extends beyond said cell and said heat absorbing members, a body of insulating material between and coextensive with said cooling members, said insulating material enclosing said cell and said heat absorbing members and being bonded to said cooling members at their said side wall contact surface which extend beyond said cell and said heat absorbing members, and a terminal lead electrically connected to each of the opposed contact surfaces of said cell.

7. A rectifier unit comprising a unilaterally conductive cell having opposed contact surfaces, a pair of heat absorbing members having opposed contact surfaces one of each of which makes a heat conducting engagement with one of the contact surfaces of said cell, said members having a thermal mass sufficient to increase by several times the thermal time constant of said cell, a pair of cooling members each of which has a uniform cross section throughout its length and has longitudinally extending cooling fluid passageways therein defined by longitudinally extending partitioning walls making a heat conductive engagement with a longitudinal side wall thereof having a contact surface part of which intimately engages an outer end of said heat absorbing members which is opposite the inner end thereof which is in engagement with a contact surface of said cell and part of which extends beyond said cell and said heat absorbing members and is provided with anchoring lugs, a body of insulating material between and coextensive with said cooling members, said insulating material enclosing said cell and said heat absorbing members and being bonded to said cooling members at their said side wall contact surfaces which extend beyond said cell and said heat absorbing members with said anchoring lugs embedded therein, and a terminal lead electrically connected to each of the opposed contact surfaces of said cell.

8. A plurality of rectifier units each of which embodies a rectifier cell having opposed contact surfaces and a pair of parallel coextensive cooling members having corresponding side walls facing one another and bonded throughout their length to an intermediate layer of insulating material except where said side walls respectively make a heat conducting engagement with one of the opposed contact surfaces of said cell, corresponding cooling members of each of said units being of uniform cross section and having lengthwise thereof a corresponding longitudinal cooling fluid passageway which terminates at its ends, means for assembling said units in end-to-end relationship with the cooling fluid passageways of corresponding cooling members in register with one another to form conduits for cooling fluid, and means for supplying cooling fluid through said conduits of said assembly.

9. A plurality of rectifier units each of which embodies a unilaterally conductive cell having opposed contact surfaces and a pair of parallel coextensive cooling members each of which makes a heat conducting engagement with one of said contact surfaces of said cell, corresponding cooling members of each of said units being of uniform cross section and having internally thereof a corresponding longitudinal cooling fluid passageway which terminates at its ends, means for assembling said rectifier units in end-to-end relationship with the cooling fluid passageways of corresponding cooling members in register with one another to form conduits for cooling fluid, means for supplying cooling fluid through said conduits of said assembly, and a terminal lead electrically connected to each of the opposed contact surfaces of said cells.

10. A plurality of rectifier units each of which comprises a unilaterally conductive cell having opposed contact surfaces, a pair of hollow open-ended cooling members each of which has a uniform cross section throughout its length and has at least one internal cooling fluid passageway along one side wall thereof, said one side wall of each of said hollow members being provided with an external contact surface adapted for making an intimate heat conducting engagement with a different one of said contact surfaces of said cell, and a body of insulating material between and coextensive with said cooling members, said insulating material totally enclosing said cell and being bonded to and holding said cooling members in parallel spaced relation with said external contact surface of each of said cooling members in heat conducting engagement with one of said contact surfaces of said cell, means for assembling said rectifier units in end-to-end relationship with the cooling fluid passageways of corresponding cooling members in register with one another to form conduits for cooling fluid, means for supplying cooling fluid through said conduits of said assembly, and a terminal lead electrically connected to each of the opposed surfaces of said cells.

11. A plurality of rectifier units each of which comprises a unilaterally conductive cell having opposed contact surfaces, a pair of hollow open-ended cooling members each of which has a uniform cross section throughout its length and has at least one internal cooling fluid passageway along one side wall thereof, said one side wall of each of said hollow members being provided with an external contact surface adapted for making an intimate heat conducting engagement with a different one of said contact surfaces of said cell, said cooling members being formed of a metal having high heat conductivity and said one side wall thereof in contact with said cell having a thermal mass sufficient to increase by several times the thermal time constant of said cell, and a body of insulating material between and coextensive with said cooling members, said insulating material enclosing said cell and being bonded to and holding said cooling members in parallel spaced relation with said external contact surface of each of said cooling members each in heat conducting engagement with a different one of said contact surfaces of said cell, means for assembling said rectifier units in end-to-end relationship with the cooling fluid passageways of corresponding cooling members in register with one another to form conduits for cooling fluid, an electrically insulating gasket between each of said rectifier units, means for supplying cooling fluid through said conduits of said assembly, and a terminal lead electrically connected to each of the opposed contact surfaces of said cells.

References Cited in the file of this patent

UNITED STATES PATENTS

| 1,718,663 | Ogden | June 25, 1929 |
| 2,718,615 | Riley | Sept. 20, 1955 |

FOREIGN PATENTS

| 1,081,675 | France | June 9, 1954 |